US009655407B2

(12) United States Patent
Reinhardt et al.

(10) Patent No.: US 9,655,407 B2
(45) Date of Patent: *May 23, 2017

(54) MULTILAYERED TEXTILE MATERIAL IN SHOES

(71) Applicant: adidas AG, Herzogenaurach (DE)

(72) Inventors: Stuart David Reinhardt, Nuremberg (DE); Matthew Chapdelaine, Herzogenaurach (DE); Heiko Schlarb, Herzogenaurach (DE); James Tarrier, Nuremberg (DE); Robert Leimer, Portland, OR (US); Chris Holmes, Veitsbronn (DE); Mark Henderson, Portland, OR (US)

(73) Assignee: adidas AG, Herzogenaurach (DE)

( * ) Notice: Subject to any disclaimer, the term of this patent is extended or adjusted under 35 U.S.C. 154(b) by 276 days.

This patent is subject to a terminal disclaimer.

(21) Appl. No.: 14/165,499

(22) Filed: Jan. 27, 2014

(65) Prior Publication Data

US 2015/0208762 A1    Jul. 30, 2015

(51) Int. Cl.
*A43B 23/02* (2006.01)
*B32B 5/02* (2006.01)
(Continued)

(52) U.S. Cl.
CPC .......... *A43B 23/0235* (2013.01); *A43B 13/12* (2013.01); *A43B 13/141* (2013.01); *A43B 23/024* (2013.01); *A43B 23/0205* (2013.01); *A43B 23/026* (2013.01); *A43B 23/027* (2013.01); *A43B 23/0225* (2013.01); *A43B 23/0265* (2013.01); *B32B 3/266* (2013.01); *B32B 5/022* (2013.01); *B32B 5/024* (2013.01); *B32B 5/04* (2013.01); *B32B 5/12* (2013.01); *B32B 5/26* (2013.01); *B32B 27/12* (2013.01);
(Continued)

(58) Field of Classification Search
CPC .............. A43B 23/0235; A43B 23/024; A43B 23/0205; A43B 23/0225; A43B 23/0265; A43B 23/027
USPC ........................................................... 36/45
See application file for complete search history.

(56) References Cited

U.S. PATENT DOCUMENTS

| | | |
|---|---|---|
| 4,194,041 A | 3/1980 | Allen et al. |
| 4,622,254 A | 11/1986 | Nishimura et al. |

(Continued)

FOREIGN PATENT DOCUMENTS

| | | |
|---|---|---|
| CN | 1342046 | 3/2002 |
| CN | 101678637 | 3/2010 |

(Continued)

OTHER PUBLICATIONS

U.S. Appl. No. 14/246,740, filed Apr. 7, 2014, Lankes et al.
(Continued)

*Primary Examiner* — Marie Bays
(74) *Attorney, Agent, or Firm* — Kilpatrick Townsend & Stockton LLP (57) ABSTRACT

Described are shoe uppers in which at least a portion thereof is formed of a multilayered material. The multilayered material includes at least one nonwoven fiber layer with unidirectionally oriented fibers and a matrix material, wherein the multilayered material has elastic properties that allow the multilayered material to deform when stretched over a three dimensional mold.

34 Claims, 11 Drawing Sheets

(51) Int. Cl.

| | | |
|---|---|---|
| *B32B 5/04* | (2006.01) | |
| *B32B 5/12* | (2006.01) | |
| *B32B 5/26* | (2006.01) | |
| *B32B 27/12* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 27/40* | (2006.01) | |
| *B32B 3/26* | (2006.01) | |
| *A43B 13/12* | (2006.01) | |
| *A43B 13/14* | (2006.01) | |

(52) U.S. Cl.
CPC ............ *B32B 27/304* (2013.01); *B32B 27/32* (2013.01); *B32B 27/34* (2013.01); *B32B 27/36* (2013.01); *B32B 27/40* (2013.01); *B32B 2262/0253* (2013.01); *B32B 2262/0261* (2013.01); *B32B 2262/0269* (2013.01); *B32B 2262/0276* (2013.01); *B32B 2262/106* (2013.01); *B32B 2262/108* (2013.01); *B32B 2262/12* (2013.01); *B32B 2274/00* (2013.01); *B32B 2307/51* (2013.01); *B32B 2307/724* (2013.01); *B32B 2307/728* (2013.01); *B32B 2307/738* (2013.01); *B32B 2307/75* (2013.01); *B32B 2437/02* (2013.01)

(56) References Cited

U.S. PATENT DOCUMENTS

| | | | |
|---|---|---|---|
| 4,651,445 A | | 3/1987 | Hannibal |
| 5,333,568 A | | 8/1994 | Meldner et al. |
| 5,470,632 A | | 11/1995 | Meldner et al. |
| 5,529,826 A | * | 6/1996 | Tailor ................. A61F 5/01 12/142 N |
| 5,746,013 A | | 5/1998 | Fay |
| 5,789,699 A | | 8/1998 | Stewart et al. |
| 5,843,851 A | * | 12/1998 | Cochran ................. C08J 5/046 190/124 |
| 5,935,678 A | | 8/1999 | Park |
| 6,277,479 B1 | | 8/2001 | Campbell et al. |
| 7,117,899 B1 | | 10/2006 | Kim et al. |
| 7,178,267 B2 | | 2/2007 | Skaja et al. |
| 7,825,046 B2 | | 11/2010 | Hatfield et al. |
| 8,784,968 B2 | | 7/2014 | Adams et al. |
| 2002/0012784 A1 | | 1/2002 | Norton et al. |
| 2005/0077430 A1 | | 4/2005 | Preston |
| 2005/0116379 A1 | | 6/2005 | Goldsmith et al. |
| 2005/0126038 A1 | | 6/2005 | Skaja et al. |
| 2008/0022554 A1 | * | 1/2008 | Meschter ................ A43B 7/14 36/45 |
| 2009/0133287 A1 | * | 5/2009 | Meschter ................ A43B 7/14 36/12 |
| 2011/0023327 A1 | | 2/2011 | Auger et al. |
| 2011/0219943 A1 | | 9/2011 | Arvidson et al. |
| 2011/0225847 A1 | | 9/2011 | Buchanan et al. |
| 2012/0073063 A1 | | 3/2012 | Downs et al. |
| 2012/0100334 A1 | | 4/2012 | Adams et al. |
| 2012/0246973 A1 | | 10/2012 | Dua |
| 2012/0329354 A1 | | 12/2012 | Afshari |
| 2013/0055590 A1 | * | 3/2013 | Mokos .................... A43B 1/04 36/45 |
| 2013/0219600 A1 | | 8/2013 | Atorrasagasti et al. |
| 2013/0247425 A1 | * | 9/2013 | Davis .................... A43B 13/02 36/30 R |
| 2014/0134378 A1 | | 5/2014 | Downs et al. |
| 2014/0338222 A1 | * | 11/2014 | Song .................. A43B 23/0235 36/45 |
| 2015/0208762 A1 | * | 7/2015 | Reinhardt ............. A43B 13/00 36/45 |
| 2015/0210034 A1 | | 7/2015 | Tarrier et al. |

FOREIGN PATENT DOCUMENTS

| | | |
|---|---|---|
| WO | 0051458 | 8/2000 |
| WO | 2011163643 | 12/2011 |
| WO | 2012018959 | 2/2012 |

OTHER PUBLICATIONS

European Patent Application No. 15152685.2, European Search Report mailed Jun. 5, 2015 (6 pages).

Kinetic Composites, Inc., Laminated Panels, retrieved from the internet at http://web.archive.org/web/20010302141533/http://www.kcinc.com/solidpanels.html, Mar. 2, 2001, 2 pages.

\* cited by examiner

MULTILAYERED TEXTILE MATERIAL IN SHOES

FIELD OF THE INVENTION

The present invention relates to a material for use in shoes, and particularly shoe uppers, with a very low weight and improved tensile strength.

BACKGROUND

For many years, there has been a need to develop lighter and stronger materials to improve quality, safety, and efficiency in a vast array of industries, including but not limited to aerospace, automotive, marine, apparel, sporting goods, fiber optics, industrial safety, military and law enforcement, and electronics.

Since the 1950's, there have been numerous breakthroughs in the development of high performance fibers having many times the strength of steel at a fraction of the weight. Examples of such high performance fibers include but are not limited to polyester fibers (such as the products sold under the trade name Dacron®), nylon fibers, aramid fibers (such as the products sold under the trade names Kevlar®, Techora®, and Twaron®), carbon fibers, ultra high molecular weight polyethylene ("UHMWPE") (such as products sold under the trade names Ceran®, Dyneema®, and Spectra®), liquid crystal polymers ("LCP") (such as products sold under the trade name Vectran®) and (poly (p-phenylene-2,6-benzobisoxazole)) ("PBO") (such as products sold under the trade name Zylon®), and polyethylene naphthalate PEN fibers (such as products sold under the trade name Pentex®). For many years, these high performance fibers have been used in woven and non-woven arrangements to form multilayered composites and laminated structures.

For example, WO 2012/018959 describes the problems with using the high performance fibers in a woven configuration. Specifically, the weaving processes induce crimp in the fibers, which cause stress concentrations and wear points that significantly reduce the strength and long term performance of the fabric.

U.S. Pat. No. 5,333,568 also describes the crimping problem with woven configurations, while describing a reinforced nonwoven laminate that utilizes a reinforcing sheet of unidirectional extruded fibers in which the reinforcing sheet or sheets form one or more uni-tapes laminated to outer layers of polyester film. The fibers are uniformly embedded in the uni-tape via an elastomeric polymer matrix. The low elasticity of the high performance fibers ensures that the laminate does not stretch under a load applied in the direction of the fiber orientation. While stretch resistance is a key parameter for applications such as sails, where the laminate must be flexible without deforming under a load, such stretch resistance is problematic when the laminate is used in a process that requires some material deformation to form three dimensional objects.

In many cases, the materials described in U.S. Pat. No. 5,333,568 are manufactured with two or four layers of UHMWPE fibers sandwiched between two outer layers of polyester, wherein the fibers are superimposed in non-bias (0°/90°) and bias (0°/90°/+45°/−45°) configurations in a variety of weights. Other outer layer materials that have been used with the UHMWPE fiber layers include elastomeric thermoset polymers (such as urethanes and silicones), thermoplastics (such as nylon), low density polyethylene, polypropylene, thermoplastic polyurethanes, and hot melt adhesives (such as polyolefins and polyamides).

Figure 1:
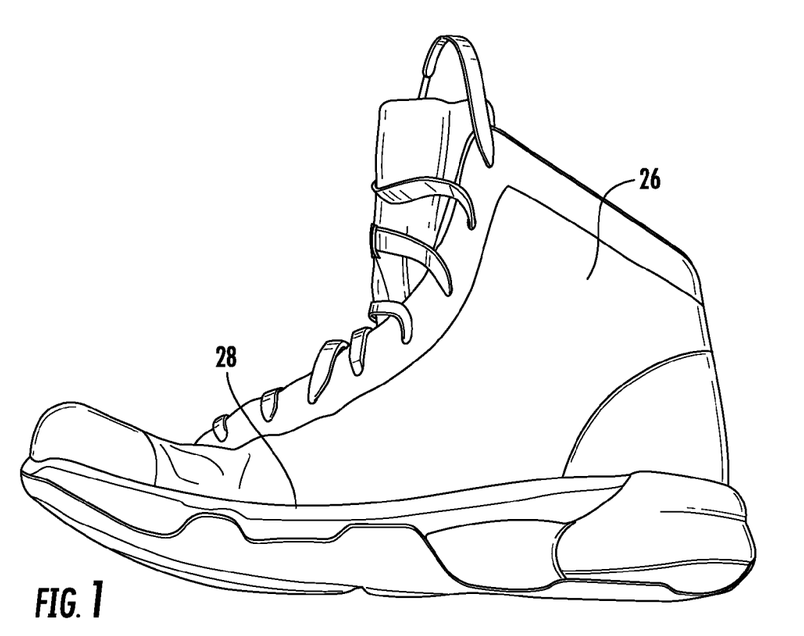
FIG. 1 is a side view of a shoe formed with a conventional multilayered textile material with a 0°/90° configuration of two fiber layers and two outer layers of polyester.
Figure 2:
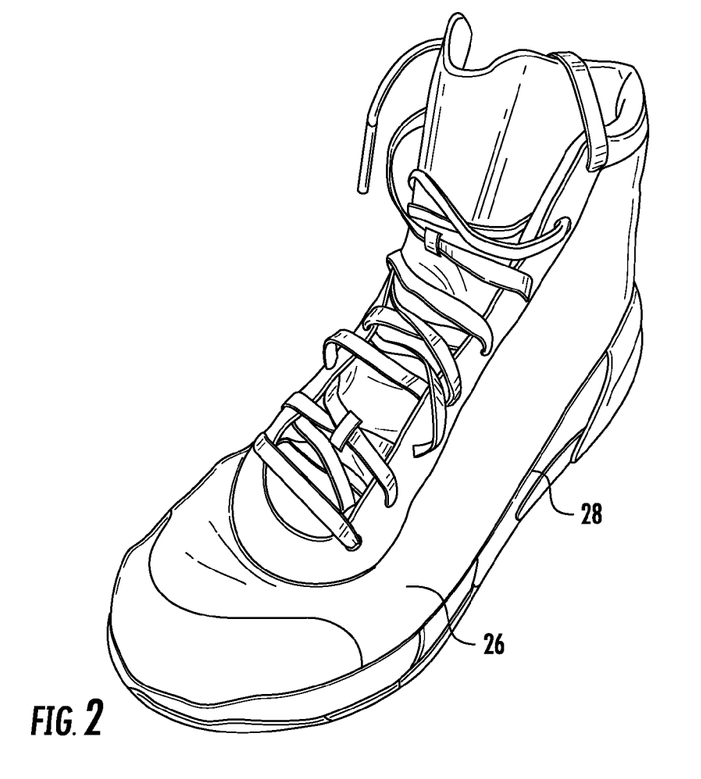
FIG. 2 is a perspective view of the shoe of FIG. 6.
Figure 3:
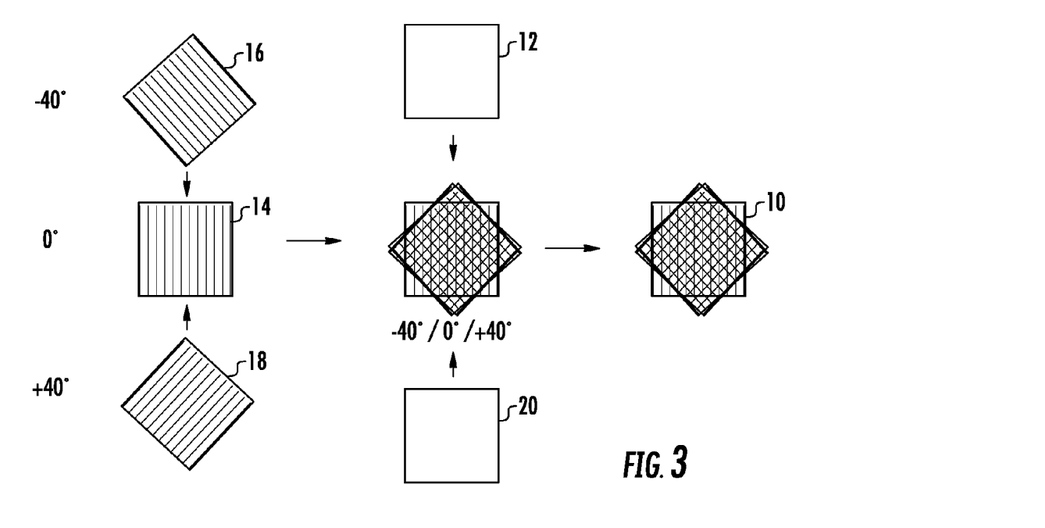
FIG. 3 is an exploded top view of one example of a process of forming a multilayered textile material with a −40°/0°/40° configuration between the fiber layers, according to certain embodiments of the present invention.
Figure 4:
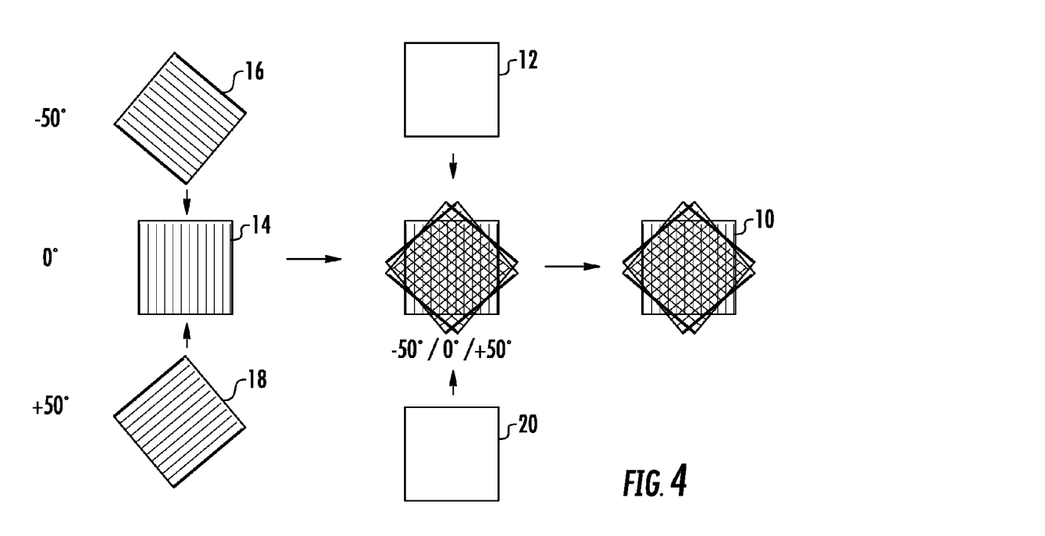
FIG. 4 is an exploded top view of the process of forming a multilayered textile material with a −50°/0°/50° configuration between the fiber layers, according to certain embodiments of the present invention.

While having a very low weight and high tensile strength, these materials have issues with crinkling, noise, unpleasant textures, and a lack of elasticity and softness. In short, the material has the look and feel of a crinkly plastic bag. Furthermore, in use, the materials often lack seam strength, stitch sheer strength, thread strength, UV resistance, and stretchability. For example, FIGS. 1 and 2 illustrate a shoe 28 formed with the material described in U.S. Pat. No. 5,333,568. As illustrated in these images, when the material described in U.S. Pat. No. 5,333,568 is placed over a shoe last to form a three dimensional shoe upper 26, the material was incapable of being stretched over the shoe last to create the three dimensional shoe upper shape. Rather, the material had to be cut and sewn in multiple places to form the rounded shape needed for the shoe upper 26.

U.S. Pat. No. 5,935,678 describes a laminate structure in sheet form with first and second arrays of high performance, unidirectionally-oriented fiber bundles. The second array of fiber bundles is cross-plied at an angle to the first array of fiber bundles. A polymeric film resides between the first and second cross-plied arrays of fiber bundles to adhere the first and second arrays of fiber bundles together. This design provides a rigid structure for use as a ballistic laminate structure, but is problematic when the laminate is used in a process that requires some material deformation to form three dimensional objects.

US 2013/0219600 describes a multilayer non-woven fabric material composed of two or four non-woven fiber sheets of aramide/polyethylene fibers, impregnated with resin and/or a filler material, and oriented at various angles, which is used for manufacturing protection garments. The superimposed non-woven fabric layers are not bonded or glued together as a way to provide a flexible material for use in protective garments. While this design provides the necessary flexibility for use in garments, the design is similar to the flexible design taught in U.S. Pat. No. 5,333,568, and therefore also does not provide the necessary elasticity when the laminate is used in a process that requires some material deformation to form three dimensional objects. Furthermore, because the fabric layers are not bonded or glued together, the material has minimal, if any, delamination strength.

Thus, it is desirable to provide a nonwoven multilayered composite and/or laminated structure, wherein each layer comprises unidirectional high performance fibers, which provides a very low weight material with high tensile strength and some elasticity so that the structure may be used in a process that requires some material deformation to form three dimensional objects. It is also desirable to incorporate such a multilayered material into shoes, and particularly into shoe uppers, in strategic locations to take advantage of the high strength and low weight of such a material.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a shoe upper comprises at least a portion formed of a multilayered material comprising at least three nonwoven fiber layers, each fiber layer comprising a plurality of unidirectionally oriented fibers, wherein the fibers in a first one of the at least three nonwoven fiber layers form an angle in the range of −25° to −65° with respect to the fibers in another one of the at least three nonwoven fiber layers, and the fibers in a second one of the at least three nonwoven fiber layers form an angle in the range of +25° to +65° with respect to the fibers in another one of the at least three nonwoven fiber layers, and a matrix material, wherein the multilayered material comprises elastic properties that allow the multilayered material to deform when stretched over a three dimensional mold.

In some embodiments, the shoe upper comprises a first portion formed of a breathable material, and a second portion formed of the multilayered material.

In some embodiments, the matrix material comprises a first outer layer adhered to a side of one of the at least three nonwoven fiber layers, and a second outer layer adhered to a side of another one of the at least three nonwoven fiber layers. The first outer layer and the second outer layer may be formed of materials selected from the group consisting of thermoplastic polyurethane, other polyurethanes, silicone, ethylene propylene diene, polyvinyl chloride, thermoplastic elastomer, polylactic acid, polyamide, and polyethylene. At least one of the first outer layer and the second outer layer may be formed of thermoplastic polyurethane and comprises screen printing.

In some embodiments, the fibers in the first one of the at least three nonwoven fiber layers form an angle in the range of −30° to −60° with respect to the fibers in another one of the at least three nonwoven fiber layers, and the fibers in the second one of the at least three nonwoven fiber layers form an angle in the range of +30° to +60° with respect to the fibers in another one of the at least three nonwoven fiber layers. In other embodiments, the fibers in the first one of the at least three nonwoven fiber layers form an angle in the range of −40° to −50° with respect to the fibers in another one of the at least three nonwoven fiber layers, and the fibers in the second one of the at least three nonwoven fiber layers form an angle in the range of +40° to +50° with respect to the fibers in another one of the at least three nonwoven fiber layers.

According to some embodiments, the fibers are formed of materials selected from the group consisting of ultra high molecular weight polyethylene, other polyethylenes, polyester, nylon, Basalt, aramid, carbon, polymer/carbon composites, liquid crystal polymers, and high performance films.

In some embodiments, substantially all of the shoe upper is formed of the multilayered material. The at least three nonwoven fiber layers may be punctured to improve breathability of the multilayered material. The shoe upper may further comprise a wicking lining to transport moisture away from the multilayered material. In other embodiments, the shoe upper may further comprise a hydrophilic layer to pull moisture away from the multilayered material.

In certain embodiments, at least one of a heel area, a midfoot area, and a toe area comprise additional layers of the multilayered material.

The fibers in at least one of the at least three nonwoven fiber layers may be aligned with a direction of high durability or stretch restriction.

According to some embodiments, a shoe comprises an upper and a sole coupled to the upper, wherein a portion of at least one of the upper and the sole comprises a multilayered material comprising at least one nonwoven fiber layer, the fiber layer comprising a plurality of unidirectionally oriented fibers, and a matrix material, wherein the multilayered material comprises elastic properties that allow the multilayered material to deform when stretched over a three dimensional mold.

In some embodiments, a shoe comprises an upper and a sole coupled to the upper, wherein a portion of at least one of the upper and the sole comprises a multilayered material comprising nonwoven fiber layers, each fiber layer comprising a plurality of unidirectionally oriented fibers, wherein the fibers in one of the nonwoven fiber layers form an angle in the range of −25° to −65° with respect to the fibers in another one of the nonwoven fiber layers, and a matrix material, wherein the multilayered material comprises elastic properties that allow the multilayered material to deform when stretched over a three dimensional mold.

In some embodiments, the matrix material comprises a first outer layer adhered to a side of one of the nonwoven fiber layers, and a second outer layer adhered to a side of another one of the nonwoven fiber layers. The first outer layer and the second outer layer may be formed of materials selected from the group consisting of thermoplastic polyurethane, other polyurethanes, silicone, ethylene propylene diene, polyvinyl chloride, thermoplastic elastomer, polylactic acid, polyamide, and polyethylene. At least one of the first outer layer and the second outer layer may be formed of thermoplastic polyurethane and comprises screen printing.

In some embodiments, the fibers in the first one of the nonwoven fiber layers form an angle in the range of −30° to −60° with respect to the fibers in another one of the at least three nonwoven fiber layers. In other embodiments, the fibers in the first one of the nonwoven fiber layers form an angle in the range of −40° to −50° with respect to the fibers in another one of the at least three nonwoven fiber layers.

According to some embodiments, the fibers are formed of materials selected from the group consisting of ultra high molecular weight polyethylene, other polyethylenes, polyester, nylon, Basalt, aramid, carbon, polymer/carbon composites, liquid crystal polymers, and high performance films.

In some embodiments, substantially all of the shoe upper is formed of the multilayered material. According to some embodiments, the multilayered material forms a bottom plate in the sole. In certain embodiments, at least one of a heel area, a midfoot area, and a toe area comprise additional layers of the multilayered material.

The fibers in at least one of the at least three nonwoven fiber layers may be aligned with a direction of high durability or stretch restriction.

BRIEF DESCRIPTION OF THE DRAWINGS

In the following detailed description, embodiments of the invention are described referring to the following figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention provide textile materials having low weight, high tensile strength, and some elasticity for use with processes that require some material deformation to form three dimensional objects. While the textile materials are discussed having three fiber layers and two outer layers, they are by no means so limited. Rather, embodiments of the textile materials may include any suitable number of fiber and/or other layers as needed or desired to achieve three dimensional objects with the desired properties.

FIGS. 3-6 illustrate embodiments of a multilayered textile material 10. In these embodiments, the material 10 comprises a first outer layer 12, a first layer of unidirectionally oriented fibers (i.e., nonwoven fiber layer) 14, a second layer of unidirectionally oriented fibers (i.e., nonwoven fiber layer) 16 oriented at a first angle relative to the first fiber layer 14, a third layer of unidirectionally oriented fibers (i.e., nonwoven fiber layer) 18 oriented at a second angle relative to the first fiber layer 14, and a second outer layer 20.

While the embodiments illustrated in FIGS. 3-6 indicate that the material 10 includes three fiber layers, the material 10 may include any suitable combination of layers including but not limited to one nonwoven fiber layer 14, 16, or 18, two nonwoven fiber layers oriented at any suitable angle to each other in any combination of nonwoven fiber layers, or more than three nonwoven fiber layers.

According to certain embodiments, the first and second outer layers 12, 20 (i.e., matrix material) are formed of thermoplastic polyurethane ("TPU"). TPU provides good elasticity properties, which allow the material 10 to stretch when a load is applied in any direction that does not align with a direction of fiber orientation. The amount of stretch provided by the TPU material increases as the angle between the direction of the load application and the direction of the fiber orientation increases. In other words, when the direction of the load application is only a few degrees from the direction of the fiber orientation, the material 10 will stretch a small amount, but the amount of stretch will increase as the angle widens between the direction of the load application and the direction of the fiber orientation. Other outer layer materials may include polyurethane ("PU"), silicone, ethylene propylene diene ("EPDM"), polyvinyl chloride ("PVC"), thermoplastic elastomer ("TPE"), polylactic acid ("PLA"), polyamide ("PA"), and polyethylene ("PE"), or other suitable materials. The first and second outer layers 12, 20 may be formed of the same or different materials to achieve the desired properties.

In some embodiments, the fibers in the first, second, and third fiber layers 14, 16, 18 are formed of UHMWPE. In certain embodiments, the UHMWPE fibers may be up to 15 times stronger than steel, but up to 40% lighter than materials like aramids. UHMWPE fibers have very little elasticity and are very difficult to break. Other fiber materials may include polyester fibers (such as the products sold under the trade name Dacron®), nylon fibers, natural fibers such as Basalt, aramid fibers (such as the products sold under the trade names Kevlar®, Techora®, and Twaron®), carbon fibers, high performance films (such as polyethylene naphthalate ("PEN") films and products sold under the trade name Mylar®), polymer/carbon composites (such as single-wall carbon nanotubes ("SWCNT") or graphene) and may include but is not limited to combinations of polyvinylalcohol/carbon and/or polyacrylonitrile/carbon, liquid crystal polymers ("LCP") (such as products sold under the trade name Vectran®) and (poly (p-phenylene-2, 6-benzobisoxazole)) ("PBO") (such as products sold under the trade name Zylon®), polyethylenes (such as products sold under the trade names Ceran®, Dyneema®, and Spectra®) and PEN fibers (such as products sold under the trade name Pentex®), or other suitable materials. The first, second, and third fiber layers 14, 16, 18 may be formed of the same or different materials to achieve the desired properties.

In certain embodiments, the fibers within each individual fiber layer may be formed of the same material with the same properties. In other embodiments, one or more of the individual fiber layers may include fibers formed of at least two different materials. The fibers may be arranged within the individual fiber layer to create zones or in certain orders to vary the material properties of the individual fiber layer.

In certain embodiments, the fibers have a thickness of less than 1 denier. The tear strength of the material 10 is influenced by the density or number of crossover points between the fiber layers 14, 16, 18. Higher crossover densities may be achieved by smaller diameter fibers and/or increasing the number of threads in a given area. However, a person of ordinary skill in the relevant art will understand that different fiber thicknesses and concentrations may be used in the various fiber layers 14, 16, 18 to achieve the desired properties.

Each fiber layer 14, 16, 18 may be formed by coating each fiber with resin and pulling the resin-coated fibers in parallel through a die so that the fibers are laterally married to form a unidirectional tape. Additional description of one possibility regarding the formation of each fiber layer 14, 16, 18 is found in U.S. Pat. No. 5,333,568 and U.S. Pat. No. 5,470,632, the contents of each of which is incorporated herein by reference.

The three fiber layers 14, 16, 18 are arranged in a regular pattern in the range of) (−40°/0°/40°) and (−50°/0°/50°), as illustrated in FIGS. 3-6. In other words, in the examples illustrated in FIGS. 3 and 5, the second fiber layer 16 is positioned adjacent the first fiber layer 14 so that the fibers in the second fiber layer 16 form an angle of −40° with respect to the fibers in the first fiber layer 14, and the third fiber layer 18 is positioned adjacent an opposite side of the first fiber layer 14 so that the fibers in the third fiber layer 18 form an angle of +40° with respect to the fibers in the first fiber layer 14. In certain embodiments, the arrangement of at least three fiber layers in the material 10 may range anywhere from (−25° to −65°)/0°/(+25° to +65°, may range anywhere from (−30° to −60°)/0°/(+30° to +60°, may range anywhere from (−35° to −55°)/0°/(+35° to +55°), or may range anywhere from (−40° to −50°)/0°/(+40° to +50°). Furthermore, the orientation of the fiber layers within these ranges may be symmetrical, such as the (−40°/0°/40°) and (−50°/0°/50°) embodiments illustrated in FIGS. 3-6, but it is also possible to have embodiments where the orientation of the fiber layers within these ranges may be asymmetrical, such as (43°/0°/−50°) or other asymmetrical variations. Similar ranges may be used for the arrangement of two fiber layers or four or more fiber layers in the material 10.

Other patterns, such as an asymmetrical pattern of (−90°/0°/45°), were tested but did not provide the appropriate amount of stretch to allow the material 10 to form the three dimensional object without wrinkles or folds. The resin-coating on the fibers that bonds the fibers to form the unidirectional tape of each fiber layer 14, 16, 18 may also be activated with heat and/or pressure to adhere the fiber layers 14, 16, 18 to each other.

As illustrated in FIGS. 3-6, the outer layers 12, 20 (i.e., matrix material) are placed above and below the three fiber layers 14, 16, 18. An adhesive, in addition to heat and/or pressure, may be used to bond the outer layers 12, 20 to the fiber layers 16 and 18. The resulting material 10 is a two-dimensional composite sheet.

In the embodiments where the outer layers 12, 20 are formed of TPU, the resulting material 10 has a nice appearance and feel, and the outer layers 12, 20 provide a surface that is easily connectable to other elements, such as other TPU layers and/or other TPU elements. For example, in the case of footwear, the material 10 may be easily connected to heel counters, midsoles, or TPU foils.

The features of material 10 according to certain exemplary embodiments are set forth below. However, these are just examples, as one of ordinary skill in the relevant art would understand that there may be other combinations and/or properties of the material 10 that are not illustrated in the table below.

| Material Description | Elasticity | Weight | Tensile Strength |
|---|---|---|---|
| −40°/0°/40° TPU outer layers | 0° direction - 4%<br>90° direction - 56%<br>52% increase in elasticity in the 90° direction | 183 g/sqm | 0° direction - 148 N/cm<br>90° direction - 113 N/cm<br>24% decrease in tensile strength in the 90° direction |
| −50°/0°/50° TPU outer layers | 0° direction - 4%<br>90° direction - 26%<br>22% increase in elasticity in the 90° direction | 180 g/sqm | 0° direction - 156 N/cm<br>90° direction - 135 N/cm<br>13% decrease in tensile strength in the 90° direction |

The values described in the table above represent the test results achieved from testing single samples of two embodiments of the material 10. Test results for additional samples of these embodiments may generate values that are higher or lower than those shown in the table above.

By way of comparison, the amount of elasticity demonstrated in a −90°/0°/45° polyester outer layer and −90°/0°/45° TPU outer layer is approximately the same in both the 0° direction and the 90° direction, and the amount of tensile strength is also the same in both the 0° direction and the 90° direction. Thus, the difference between the elasticity and tensile strength exhibited in the 0° direction versus the 90° direction in the embodiments of material 10 described in the table above are indicative of the changes in material properties that would be exhibited by the various embodiments of the material 10 described herein as the angles between the fiber layers are varied.

While the values in the table above do not represent the entire range of results that may be obtained with various embodiments of the material 10, the results illustrate that the magnitude of elasticity gain in the 90° direction does not result in a corresponding magnitude of tensile strength loss in the 90° direction. In fact, the elasticity increase in the 90° direction is approximately twice the tensile strength loss in the 90 degree direction. This surprising result demonstrates that elasticity and tensile strength are not inversely and linearly correlated, but rather show that elasticity may be maximized without unduly sacrificing the material 10's tensile strength properties.

Figure 8:
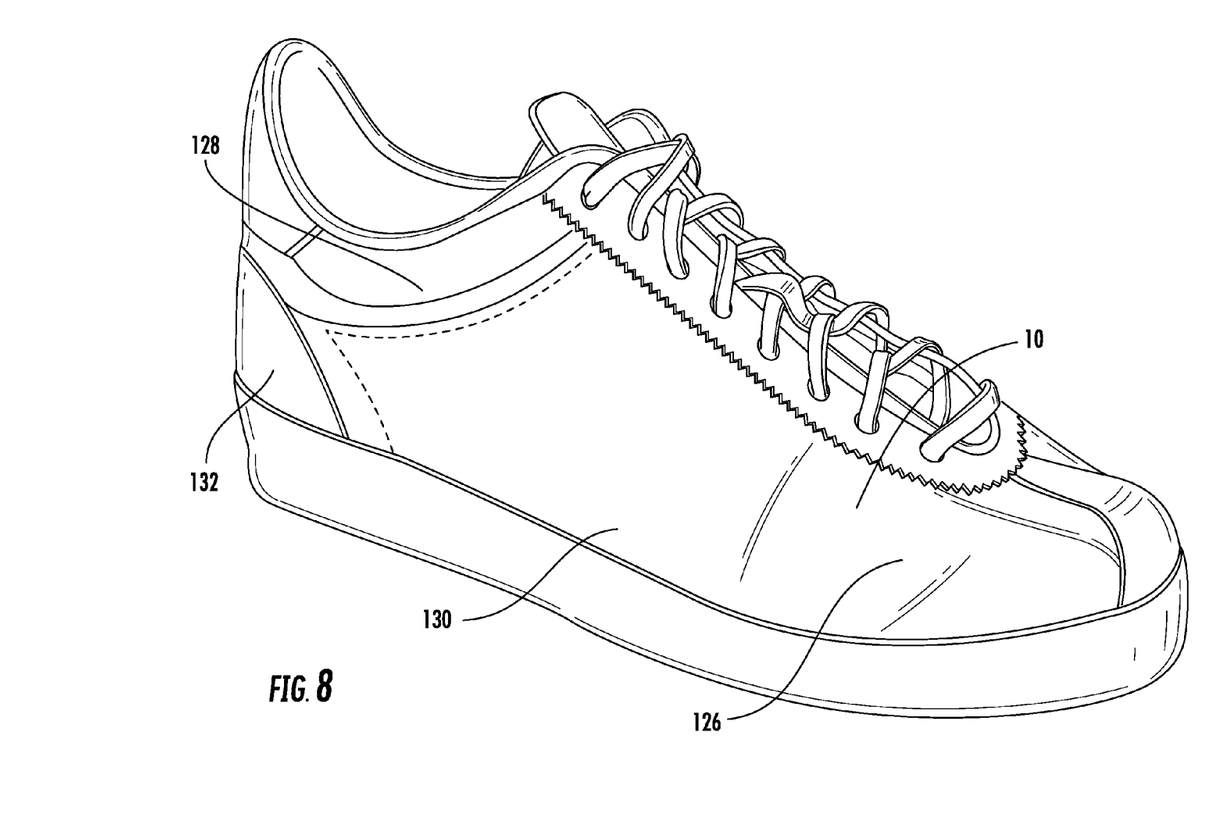
FIG. 8 is a perspective view of a shoe formed with a multilayered textile, according to certain embodiments of the present invention.

The use of outer layers 12, 20 formed of TPU also provides a surface that may be easily printed or colored, as illustrated in FIG. 8. Because the material 10 typically has a translucent appearance, the print may be applied to the side of the material 10 that will form the inner side, and the printing will be visible through the material 10. As a result, the material 10 itself will serve as a coating to protect the printing. In other embodiments, the print may be applied to the side of the material 10 that will form the outer side, and an additional coating layer may be applied to protect the printing. Printing to TPU surfaces may be accomplished with known methods including but not limited to screen printing.

Figure 5:
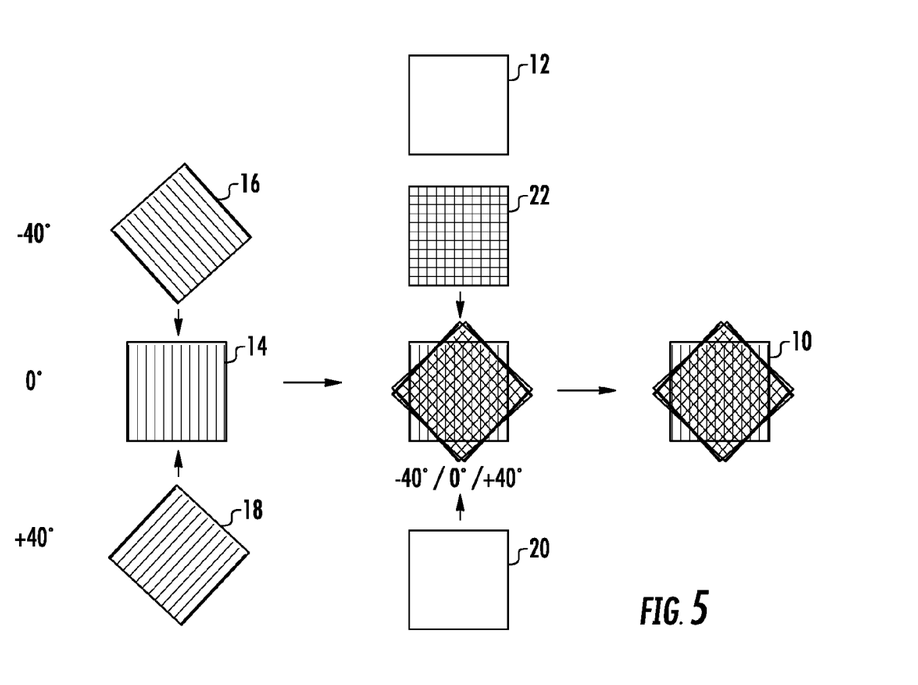
FIG. 5 is an exploded top view of the process of forming a multilayered textile material with a −40°/0°/40° configuration between the fiber layers, according to certain embodiments of the present invention.
Figure 6:
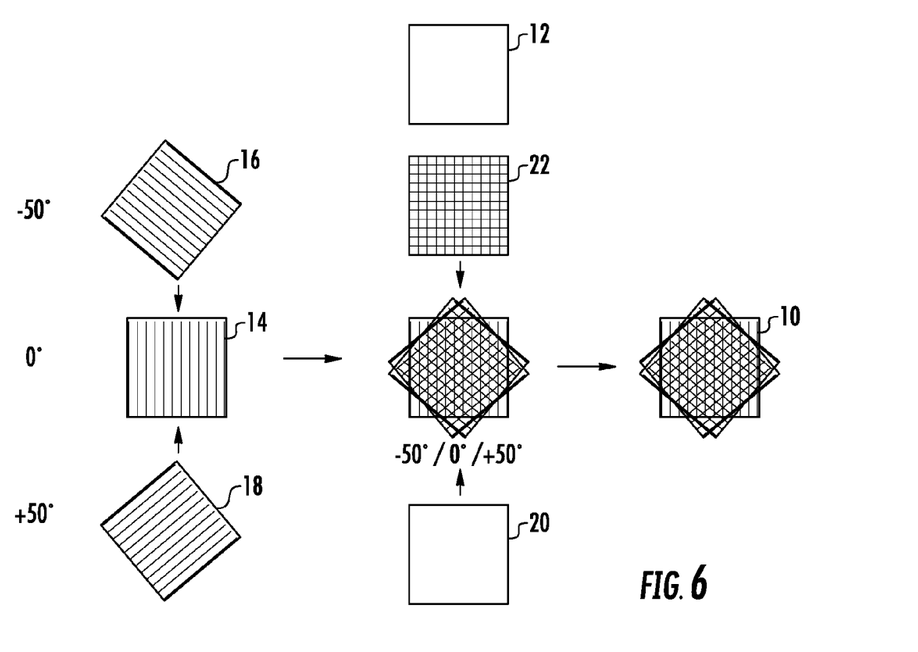
FIG. 6 is an exploded top view of the process of forming a multilayered textile material with a −50°/0°/50° configuration between the fiber layers, according to certain embodiments of the present invention.

In other embodiments, as shown in FIGS. 5-6, an additional printed or colored woven layer 22 may be included in the material 10. The layer 22 may form an outer layer that is adhered to either of the outer layers 12, 20 or may be placed between any of the layers 12, 14, 16, 18, 20.

Because the fiber layers 14, 16, 18 typically do not have any breathability, perforation of the fiber layers 14, 16, 18, preferably between fibers, may be included to improve the breathability of the material. In other embodiments, a wicking lining may be included to transport moisture away from the material 10 to other areas that are not formed of the material 10, such as a breathable mesh area that may be located adjacent the material 10, as shown in FIGS. 7a-7c and 9-10. In still other embodiments, the material 10 may include a hydrophilic layer that is designed to pull sweat or other moisture away from the material 10. The material 10 may include one, all, or any combination of these embodiments to improve the breathability of the material 10.

Figure 7A:
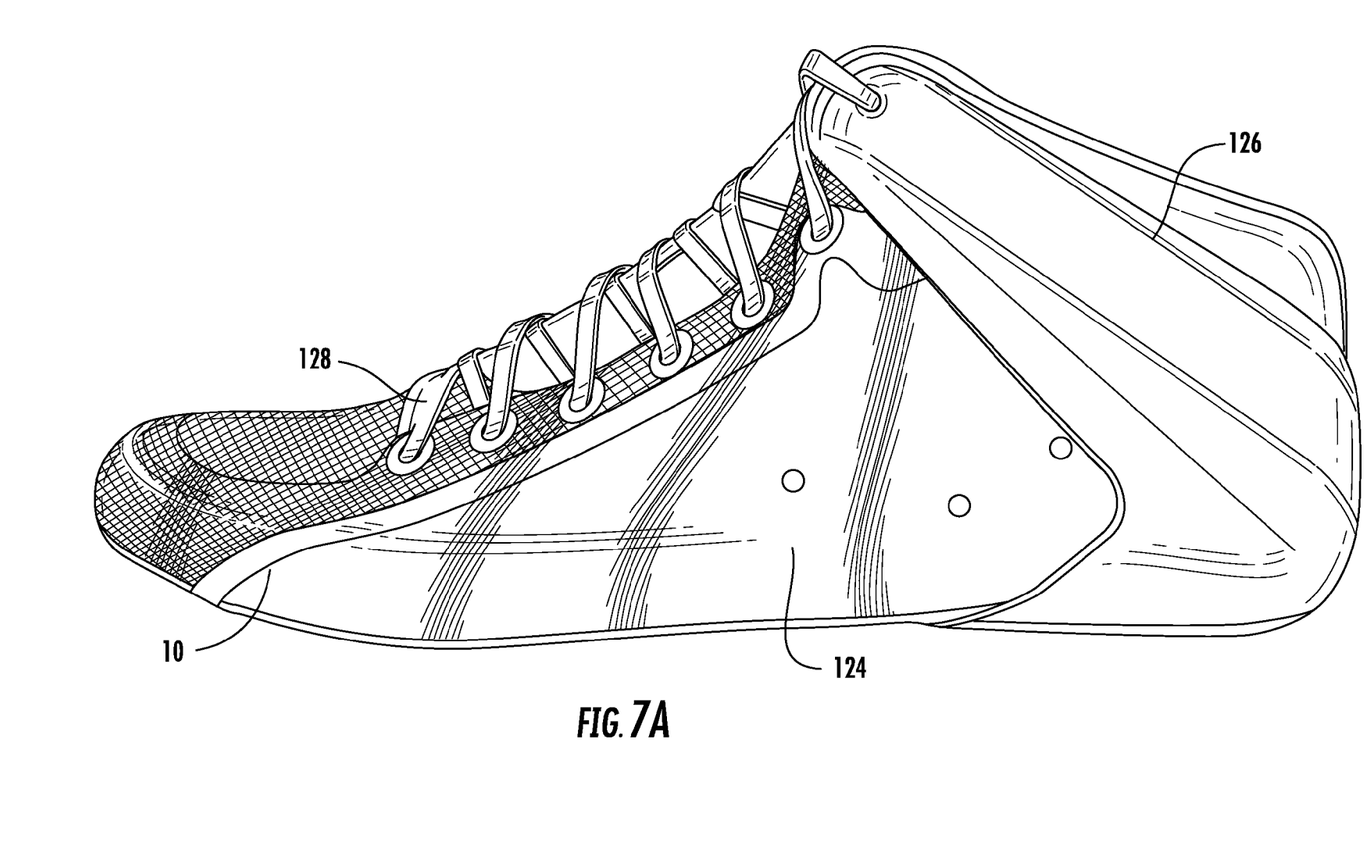
FIGS. 7a-7c are left side, right side, and front views of a multilayered textile material, according to certain embodiments of the present invention, being stretched over a three dimensional mold.
Figure 7B:
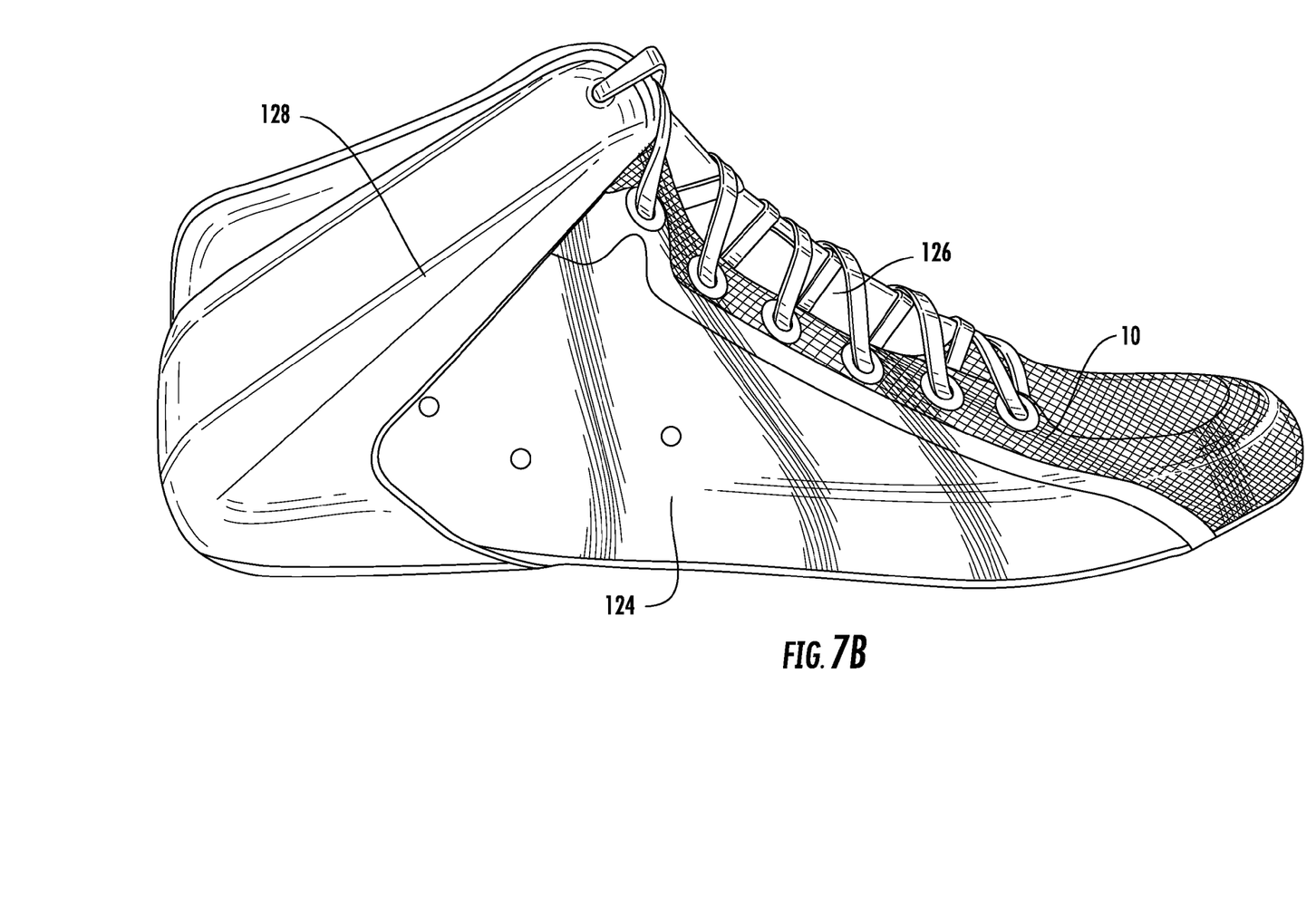
Figure 7C:
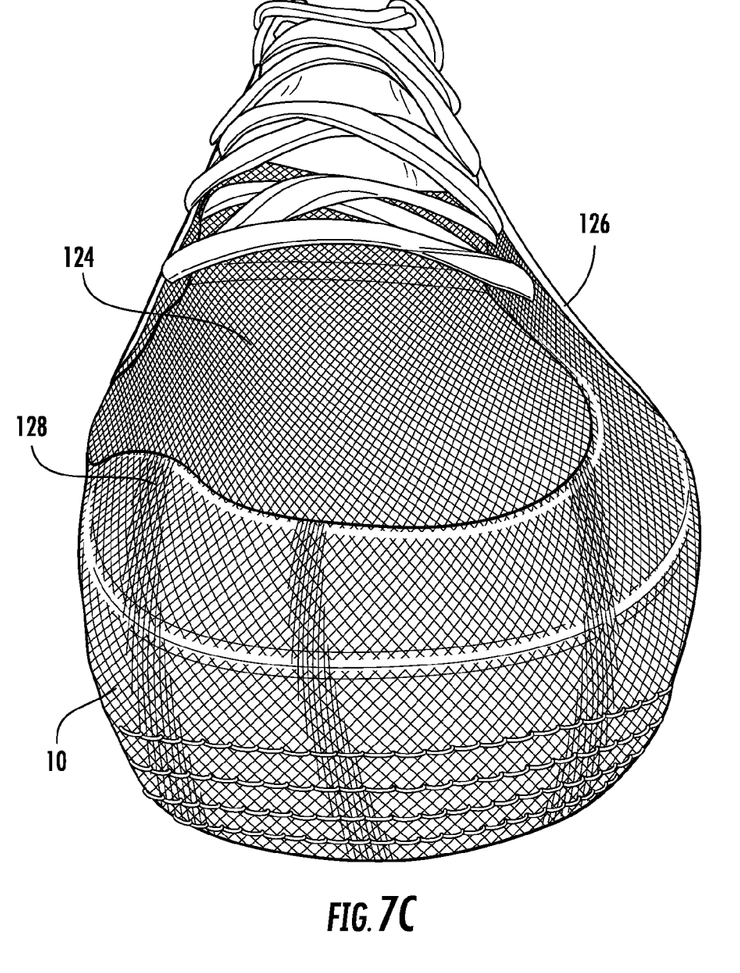

In certain embodiments, the material 10 is then stretched in certain configurations to form a three dimensional object. For example, as shown in FIGS. 7a-7c, the material 10 is deformed through stretching to conform to the shape of a three dimensional mold 124. In these embodiments, the mold 124 is a shoe last that is used to form a shoe upper 126 for a shoe 128. However, a person of skill in the relevant art will understand that the material 10 may be used to conform to any three dimensional mold 124 where some deformation of the material 10 is required for the material 10 to conform to the mold 124 with a smooth appearance.

A finished three dimensional product formed through the deformation of the material 10 by stretching the material 10 over a three dimensional mold 124 is illustrated in FIG. 8. While the product shown in FIG. 8 is a shoe 128, one of skill in the relevant art will understand that the material 10 described above may be used with any three dimensional mold 124 to stretch and deform the material 10 into a suitable three dimensional object. As shown in FIG. 8, and in comparison to FIGS. 1-2, the material 10 has a smooth surface appearance without the need to cut or sew the material 10 to achieve the required three dimensional shape. In these embodiments, additional layers of the material 10 may be added for stabilization in a midfoot area 130 and a heel area 132 of the shoe upper 126.

In certain embodiments, rather than forming the entire shoe upper 126 of the material 10, the material 10 may be incorporated into the shoe upper 126 in strategic locations to take advantage of the high strength and low weight of the material 10. Furthermore, the directionality of the fibers within the material 10 may be used to achieve particular properties in the shoe upper 126. For example, one or more fiber directions may be aligned with the direction of high durability or stretch restriction to achieve the desired properties.

For example, unidirectional fiber materials 10 may be combined with other materials like mesh, leather, or synthetic materials, and may be placed on top and/or adjacent these other materials. The areas or layers where the unidirectional fiber material 10 is used can also serve other purposes besides providing a lightweight material. For example, the material 10 may be used to provide durability, stability, stretch restriction, and formation of the three dimensional shape of the shoe 128.

Furthermore, different unidirectional fiber materials 10 may be used on the shoe 128, e.g. in certain areas where there is just one unidirectional fiber layer so that the stretch of the material is restricted in one certain direction only. For example, materials with less stretch (such as $-90°/0°/45°$) may be combined with the embodiments of material 10 described herein in areas of the shoe 128 that are next to each other.

Figure 9:
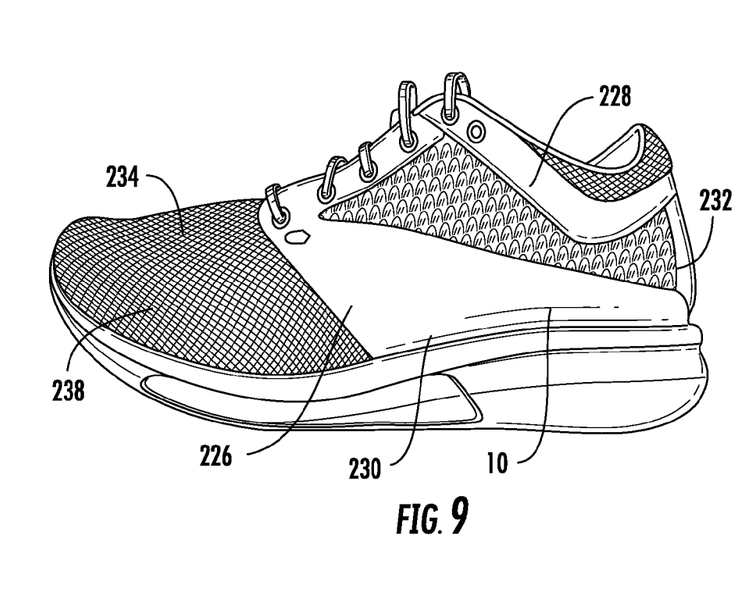
FIG. 9 is a side view of a shoe formed with a multilayered textile incorporated into certain portions of a shoe upper, according to certain embodiments of the present invention.
Figure 10:
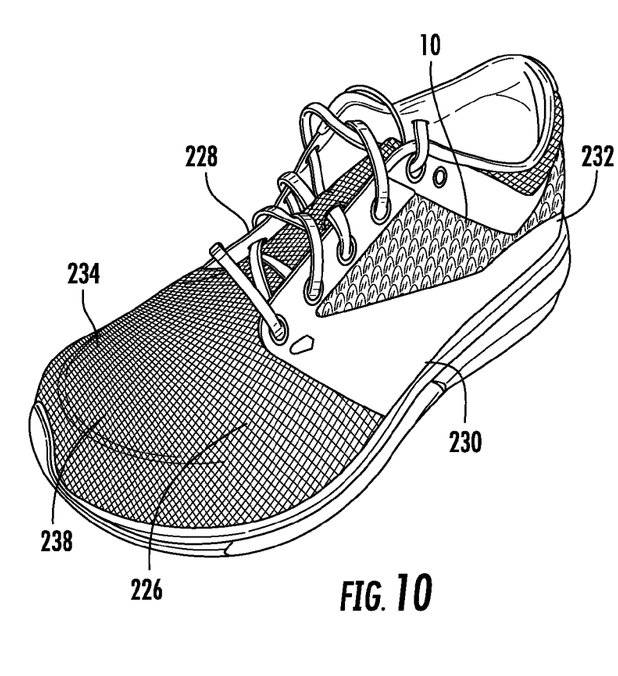
FIG. 10 is a perspective view of the shoe of FIG. 9.

In certain embodiments of a shoe 228, as shown in FIGS. 9-10, the material 10 is incorporated into a midfoot area 230 and a heel area 232 of a shoe upper 226, while a forefoot area 234 of the shoe upper 226 is formed of a breathable material 238. By strategically placing the material 10 in areas where higher strength is needed and using breathable material 238 in areas where the strength is not as critical, the shoe upper 226 takes advantage of the high strength and low weight properties of the material 10 where those properties are of a higher importance, while also maintaining a highly breathable shoe. As illustrated in FIGS. 9-10, the two materials 10, 238 are blended with a matching print detail on both the material 10 and the breathable material 238, which creates a seamless look. The breathable material 238 may include but is not limited to mesh, polyester, polyamide, and spandex/elastane.

Figure 11:
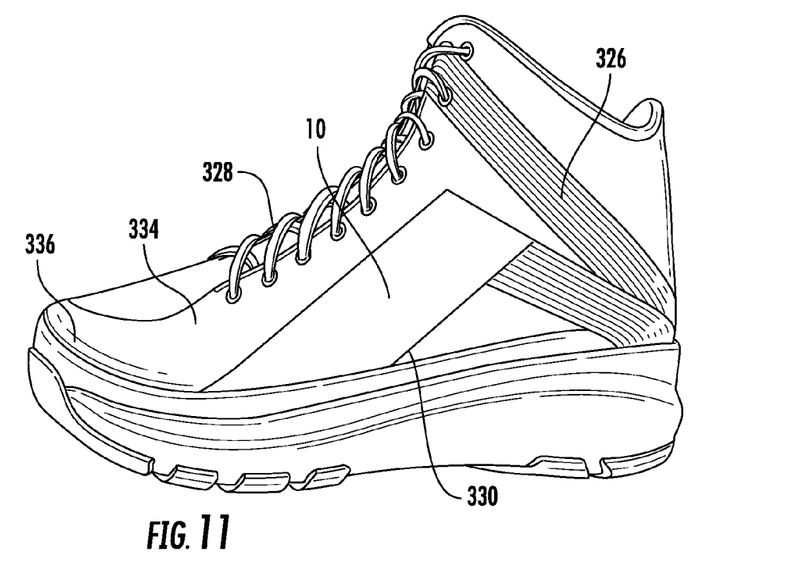
FIG. 11 is a side view of a shoe formed with a multilayered textile incorporated into certain portions of a shoe upper, according to certain embodiments of the present invention.
Figure 12:
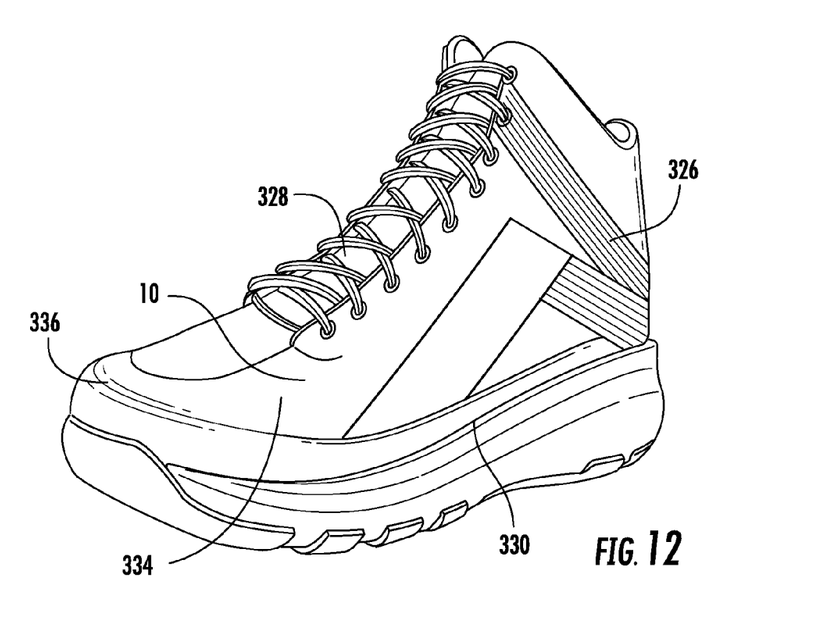
FIG. 12 is a perspective view of the shoe of FIG. 11.

As additional examples of embodiments that strategically incorporate the material 10 into a shoe upper 326 of a shoe 328, FIGS. 11-12 illustrate the use of material 10 in a forefoot area 334 and a midfoot area 330 of the shoe upper 326. In these embodiments, additional separate layers of the material 10 may be added for stabilization in the midfoot area 330 and a toe area 336.

Figure 13:
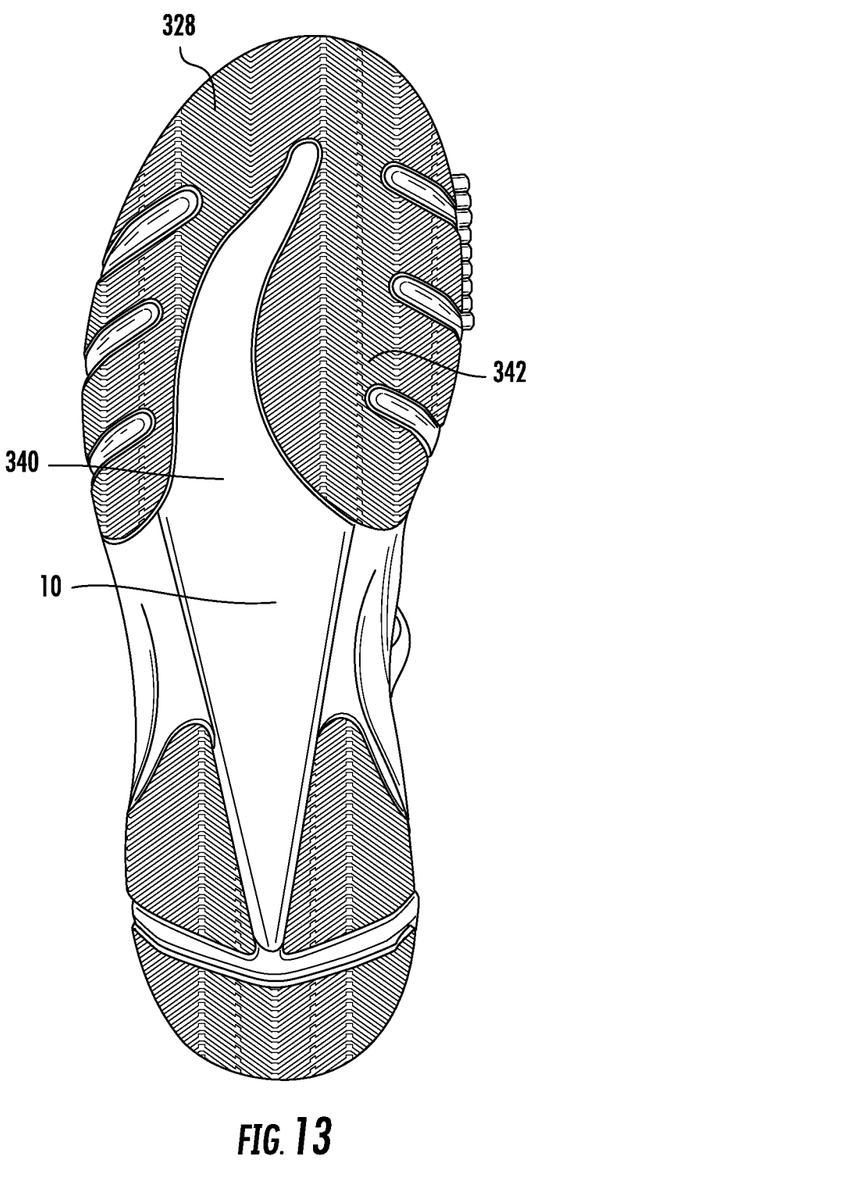
FIG. 13 a bottom view of a shoe formed with a multilayered textile incorporated into certain portions of a shoe sole, according to certain embodiments of the present invention.

The use of the material 10 in strategic locations is not limited to shoe uppers. For example, as illustrated in FIG. 13, the material 10 may be used to form a torsion bar or bottom plate 340 in a sole 342 of the shoe 328. The material 10 is implemented so that the fibers work in tension when the bottom unit is bent. The high strength and lightness of the material 10 allows the textile product to be used in place of a component that is conventionally formed of plastic.

In addition to the mechanical aspects of the shoe 128 discussed above, the material 10 may be used in any mechanical application that is typically used to control the stretch and bending behavior of the sole 342 (including a bottom plate). The benefit of using the material 10 in such applications is that independent movement of the forefoot and midfoot may be achieved, which simultaneously restricting bending behavior. In short, unlike most conventional applications, the material 10 is configured to restrict certain undesirable movements, while allowing other desirable movements. Thus, strategic use of the material 10 in the sole 342 increases stability without adding weight.

Figure 14:
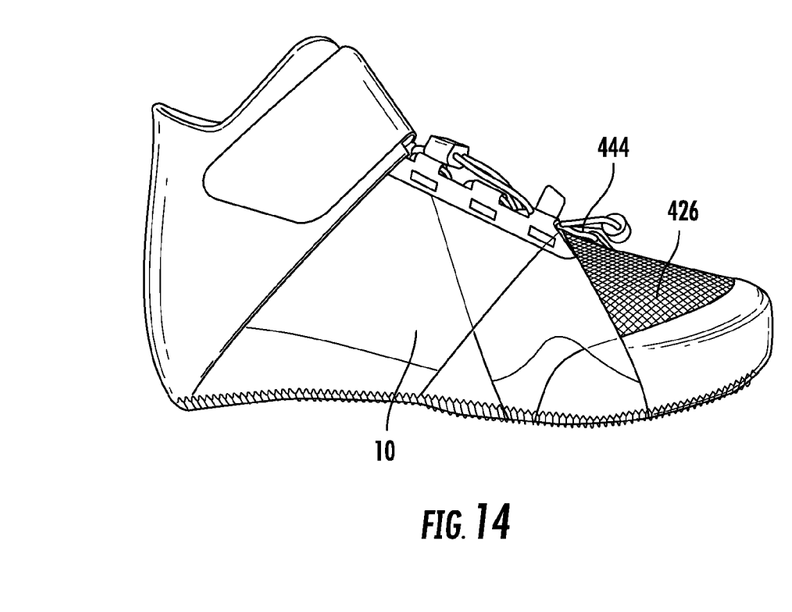
FIG. 14 is a side view of a shoe formed with a multilayered textile incorporated into certain portions of a shoe upper, according to certain embodiments of the present invention.
Figure 15:
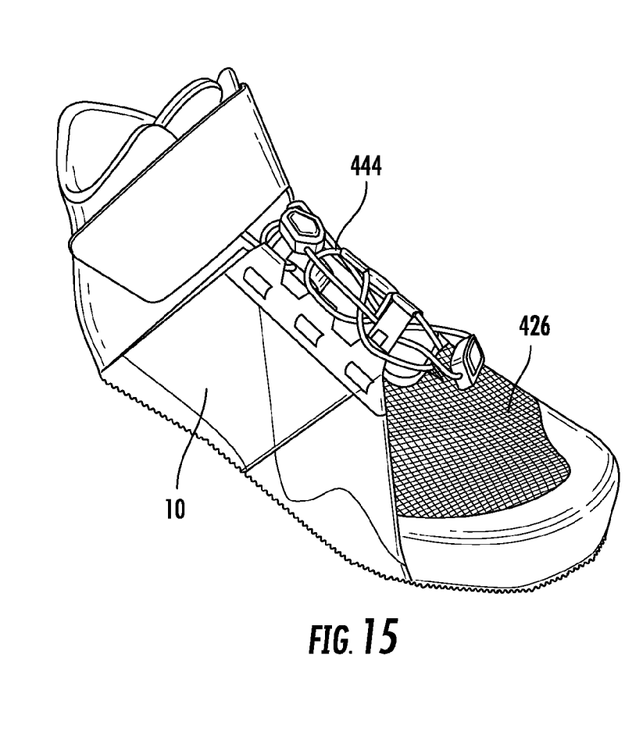
FIG. 15 is a perspective view of the shoe of FIG. 14.

In yet other embodiments, the material 10 may be incorporated over a portion of a shoe upper 426 formed of other materials and used to reinforce lacing 444. In these embodiments, the material 10 is folded over itself at an angle to achieve multiple preferred directions of the fibers.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the That which is claimed is:

1. A shoe upper comprising at least a portion formed of a multilayered material comprising:
   (a) a collection of an odd number of nonwoven fiber layers, wherein the collection comprises a base layer and at least one set of paired layers, each nonwoven fiber layer comprising a plurality of unidirectionally oriented fibers, wherein the fibers in a first layer of the at least one set of paired layers form an angle in the range of −25° to 65° with respect to the fibers in the base layer, and the fibers in a second layer of the at least one set of paired layers form an angle in the range of +25° to +65° with respect to the fibers in the base layer; and
   (b) a matrix material;
   wherein the multilayered material comprises elastic properties that allow the multilayered material to deform into a smooth three dimensional shape when the multilayered material is stretched over a three dimensional mold, wherein the multilayered material is not cut or sewn to eliminate wrinkles in the smooth three dimensional shape.

2. The shoe upper of claim 1, wherein the matrix material comprises a first outer layer adhered to a side of one of the nonwoven fiber layers, and a second outer layer adhered to a side of another one of the nonwoven fiber layers.

3. The shoe upper of claim 2, wherein the first outer layer and the second outer layer are formed of materials selected from the group consisting of thermoplastic polyurethane, other polyurethanes, silicone, ethylene propylene diene, polyvinyl chloride, thermoplastic elastomer, polylactic acid, polyamide, and polyethylene.

4. The shoe upper of claim 2, wherein at least one of the first outer layer and the second outer layer is formed of thermoplastic polyurethane and comprises screen printing.

5. The shoe upper of claim 1, wherein the fibers in the first layer of the at least one set of paired layers form an angle in the range of −30° to 60° with respect to the fibers in the base layer, and the fibers in the second layer of the at least one set of paired layers form an angle in the range of +30° to +60° with respect to the fibers in the base layer.

6. The shoe upper of claim 1, wherein the fibers in the first layer of the at least one set of paired layers form an angle of −40° or −50° with respect to the fibers in the base layer, and the fibers in the second layer of the at least one set of paired layers form an angle of +40° or +50° with respect to the fibers in the base layer.

7. The shoe upper of claim 1, wherein the fibers are formed of materials selected from the group consisting of ultra high molecular weight polyethylene, other polyethylenes, polyester, nylon, Basalt, aramid, carbon, polymer/carbon composites, liquid crystal polymers, and high performance films.

8. The shoe upper of claim 1, wherein substantially all of the shoe upper is formed of the multilayered material.

9. The shoe upper of claim 8, wherein the nonwoven fiber layers are punctured to improve breathability of the multilayered material.

10. The shoe upper of claim 8, further comprising a wicking lining to transport moisture away from the multilayered material.

11. The shoe upper of claim 8, wherein the multilayered material further comprises a hydrophilic layer to pull moisture away from the multilayered material.

12. The shoe upper of claim 1, wherein at least one of a heel area, a midfoot area, and a toe area comprise additional layers of the multilayered material.

13. The shoe upper of claim 1, wherein the fibers in at least one of the nonwoven fiber layers are aligned with a direction of high durability or stretch restriction.

14. A shoe upper comprising:
   (a) a first portion formed of a breathable material;
   (b) a second portion formed of a multilayered material comprising:
      (i) a collection of an odd number of nonwoven fiber layers, wherein the collection comprises a base layer and at least one set of paired layers, each nonwoven fiber layer comprising a plurality of unidirectionally oriented fibers, wherein the fibers in a first layer of the at least one set of paired layers form an angle in the range of −25° to 65° with respect to the fibers in the base layer, and the fibers in a second layer of the at least one set of paired layers form an angle in the range of +25° to +65° with respect to the fibers in the base layer; and
      (ii) a matrix material;
      wherein the multilayered material comprises elastic properties that allow the multilayered material to deform into a smooth three dimensional shape when the multilayered material is stretched over a three dimensional mold, wherein the multilayered material is not cut or sewn to eliminate wrinkles in the smooth three dimensional shape.

15. The shoe upper of claim 14, wherein the matrix material comprises a first outer layer adhered to a side of one of the nonwoven fiber layers, and a second outer layer adhered to a side of another one of the nonwoven fiber layers.

16. The shoe upper of claim 15, wherein the first outer layer and the second outer layer are formed of materials selected from the group consisting of thermoplastic polyurethane, other polyurethanes, silicone, ethylene propylene diene, polyvinyl chloride, thermoplastic elastomer, polylactic acid, polyamide, and polyethylene.

17. The shoe upper of claim 15, wherein at least one of the first outer layer and the second outer layer is formed of thermoplastic polyurethane and comprises screen printing.

18. The shoe upper of claim 14, wherein the fibers in the first layer of the at least one set of paired layers form an angle in the range of −30° to −60° with respect to the fibers in the base layer, and the fibers in the second layer of the at least one set of paired layers form an angle in the range of +30° to +60° with respect to the fibers in the base layer.

19. The shoe upper of claim 14, wherein the fibers in the first layer of the at least one set of paired layers form an angle of −40° or −50° with respect to the fibers in the base layer, and the fibers in the second layer of the at least one set of paired layers form an angle of +40° or +50° with respect to the fibers in the base layer.

20. The shoe upper of claim 14, wherein the fibers are formed of materials selected from the group consisting of ultra high molecular weight polyethylene, other polyethylenes, polyester, nylon, Basalt, aramid, carbon, polymer/carbon composites, liquid crystal polymers, and high performance films.

21. The shoe upper of claim 14, wherein at least one of a heel area, a midfoot area, and a toe area comprise additional layers of the multilayered material.

22. The shoe upper of claim 14, wherein the fibers in at least one of the nonwoven fiber layers are aligned with a direction of high durability or stretch restriction.

23. A shoe comprising:
(a) an upper; and
(b) a sole coupled to the upper;
wherein a portion of at least one of the upper and the sole comprises a multilayered material comprising:
  (i) a collection of an odd number of nonwoven fiber layers, wherein the collection comprises a base layer and at least one set of paired layers, each fiber layer comprising a plurality of unidirectionally oriented fibers; and
  (ii) a matrix material;
  wherein the multilayered material comprises elastic properties that allow the multilayered material to deform into a smooth three dimensional shape when the multilayered material is stretched over a three dimensional mold, wherein the multilayered material is not cut or sewn to eliminate wrinkles in the smooth three dimensional shape.

24. A shoe comprising:
(a) an upper; and
(b) a sole coupled to the upper;
wherein a portion of at least one of the upper and the sole comprises a multilayered material comprising:
  (i) a collection of an odd number of nonwoven fiber layers, wherein the collection comprises a base layer and at least one set of paired layers, each nonwoven fiber layer comprising a plurality of unidirectionally oriented fibers, wherein the fibers in a first layer of the at least one set of paired layers form an angle in the range of −25° to 65° with respect to the fibers in the base layer, and the fibers in a second layer of the at least one set of paired layers form an angle in the range of +25° to +60° with respect to the fibers in the base layer; and
  (ii) a matrix material;
  wherein the multilayered material comprises elastic properties that allow the multilayered material to deform into a smooth three dimensional shape when the multilayered material is stretched over a three dimensional mold, wherein the multilayered material is not cut or sewn to eliminate wrinkles in the smooth three dimensional shape.

25. The shoe of claim 24, wherein the matrix material comprises a first outer layer adhered to a side of one of the nonwoven fiber layers, and a second outer layer adhered to a side of another one of the nonwoven fiber layers.

26. The shoe of claim 25, wherein the first outer layer and the second outer layer are formed of materials selected from the group consisting of thermoplastic polyurethane, other polyurethanes, silicone, ethylene propylene diene, polyvinyl chloride, thermoplastic elastomer, polylactic acid, polyamide, and polyethylene.

27. The shoe of claim 25, wherein at least one of the first outer layer and the second outer layer is formed of thermoplastic polyurethane and comprises screen printing.

28. The shoe of claim 24, wherein the fibers in one of the nonwoven fiber layers form an angle in the range of −30° to −60° with respect to the fibers in another one of the nonwoven fiber layers.

29. The shoe of claim 24, wherein the fibers in one of the nonwoven fiber layers form an angle of −40° or −50° with respect to the fibers in another one of the nonwoven fiber layers.

30. The shoe of claim 24, wherein the fibers are formed of materials selected from the group consisting of ultra high molecular weight polyethylene, other polyethylenes, polyester, nylon, Basalt, aramid, carbon, polymer/carbon composites, liquid crystal polymers, and high performance films.

31. The shoe of claim 24, wherein substantially all of the upper is formed of the multilayered material.

32. The shoe of claim 24, wherein at least one of a heel area, a midfoot area, and a toe area comprise additional layers of the multilayered material.

33. The shoe of claim 24, wherein the fibers in at least one of the nonwoven fiber layers are aligned with a direction of high durability or stretch restriction.

34. The shoe of claim 24, wherein the multilayered material forms a bottom plate in the sole.

* * * * *